United States Patent [19]

Skura

[11] Patent Number: 4,514,179
[45] Date of Patent: Apr. 30, 1985

[54] POWER TRANSMISSION BELT WITH FABRIC COVER

[75] Inventor: William A. Skura, New Haven, Conn.

[73] Assignee: Uniroyal, Inc., Middlebury, Conn.

[21] Appl. No.: 471,923

[22] Filed: Mar. 2, 1983

[51] Int. Cl.³ .............................................. F16G 1/28
[52] U.S. Cl. ..................... 474/204; 474/266
[58] Field of Search .............. 474/204, 205, 266, 267, 474/268; 57/902; 156/137

[56] References Cited

U.S. PATENT DOCUMENTS

| | | |
|---|---|---|
| 2,507,852 | 3/1950 | Case . |
| 3,078,206 | 2/1963 | Skura . |
| 3,724,284 | 4/1973 | Eng et al. ............................ 474/267 |
| 3,756,091 | 9/1973 | Miller . |
| 3,784,427 | 1/1974 | Griffin . |
| 3,937,094 | 2/1976 | Cicognani . |
| 4,037,485 | 7/1977 | Hoback . |
| 4,099,422 | 7/1978 | Cicognani et al. . |
| 4,169,393 | 10/1979 | Wetzel et al. ...................... 474/268 |
| 4,266,937 | 5/1981 | Takano ................................ 474/267 |
| 4,302,197 | 11/1981 | Kimura et al. ..................... 474/267 |

Primary Examiner—Stephen J. Novosad
Assistant Examiner—Bruce M. Kisliuk
Attorney, Agent, or Firm—Jack Posin

[57] ABSTRACT

A power transmission belt having a plurality of teeth of elastomeric material positioned along a peripheral surface of said belt, each possessing a predetermined spring rate, and a fabric cover formed over the teeth and over the land portions between the teeth, said fabric cover cooperating with said teeth such that the spring rate of each fabric covered tooth is greater than 1.2 times and less than 3 times the spring rate of such tooth alone.

12 Claims, 5 Drawing Figures

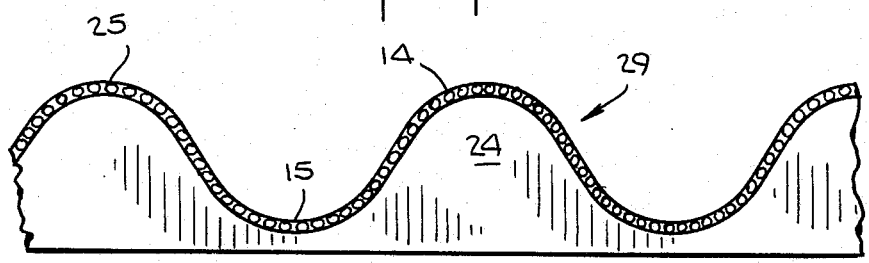
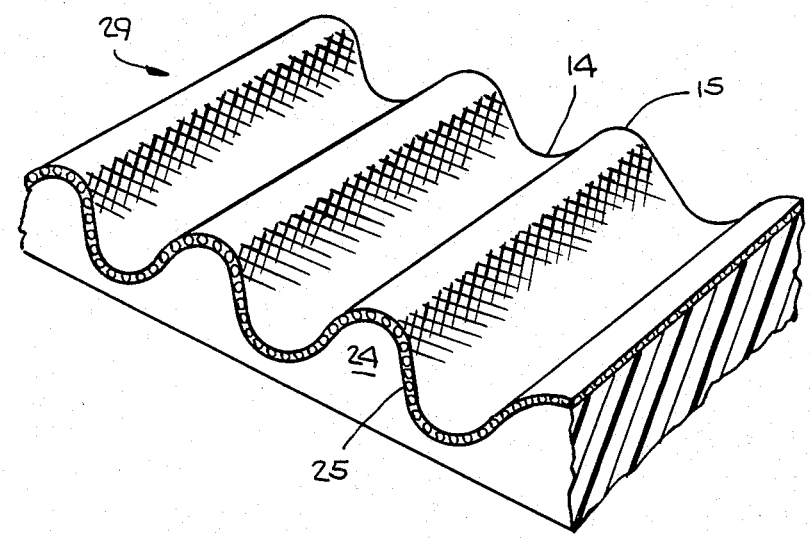

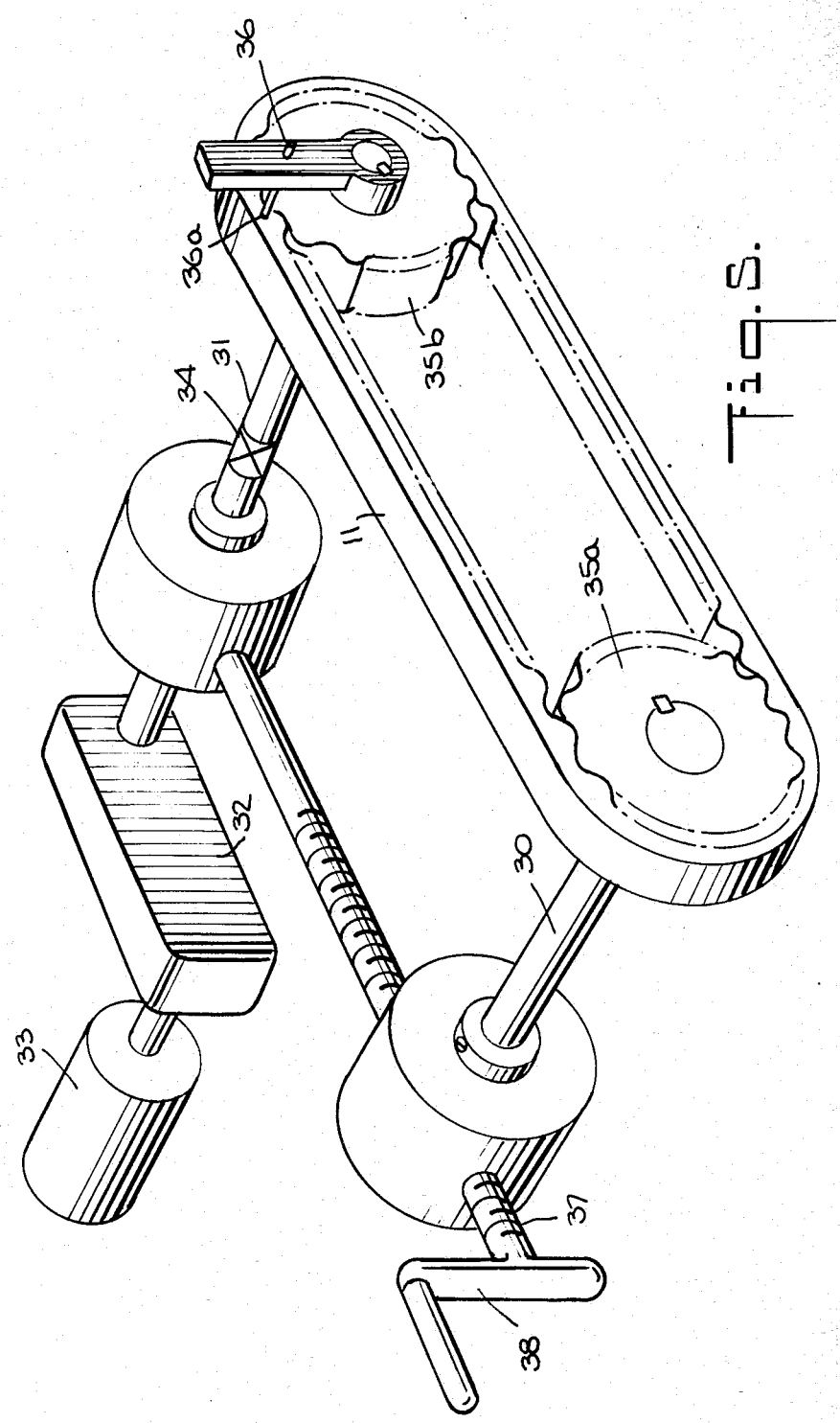

POWER TRANSMISSION BELT WITH FABRIC COVER

This invention relates to improvements in toothed, fabric covered, power transmission belts.

Toothed power transmission belts such as described in U.S. Pat. No. 2,507,852 issued to R. Y. Case and U.S. Pat. No. 3,756,091 issued to Henry F. Miller have been used for many years for the synchronous transmission of power. To obtain maximum belt life in a synchronous type belt, the tooth must be sufficiently rigid to carry the load and yet able to deflect so as to mate properly with the groove of the pulley. Since the internal strength and rigidity of the tooth elastomer is not sufficient to carry the load by itself and certainly does not itself exhibit sufficient abrasion resistance, a fabric cover is conventionally bonded on the surface of the belt. Historically, the fabric cover which has been employed was made from a so-called "stretchable" nylon fabric. Using stretchable nylon has made the production of such belts economical using the method described in Skura U.S. Pat. No. 3,078,206. Belt constructions, in which fabric is stretched to the shape of the belt teeth have been satisfactory for toothed belts used for synchronous purposes. However, as toothed belts are used in systems having greater and greater horsepower requirements, the expected life of belts constructed with stretch fabric has decreased substantially. The reason for this is believed to be the following. The conventional stretchable nylon cover which is made with loosely twisted crimped yarn has its interstices substantially stretched and filled with tooth rubber during the belt molding process. Vulcanization locks the then stretched fabric in place causing it to become stiff and consequently reducing its ability to deform under load. Under operating loads the belt teeth are however forced to deflect and subject the thusly stiffened fabric cover to excessive dynamic stresses which results in premature rupture of the rubber filled fabric cover, particularly in the tooth root area, and early belt failure. We believe that in belts made according to the Skura patent, approximately 80% of the load on the belt tooth is transmitted by the fabric and only approximately 20% by the rubber tooth itself. This ratio we believe concentrates excessive load on the fabric causing the early belt failure.

It is an object of the present invention, therefore, to construct a toothed belt having high horsepower capability and yet substantially improved belt life.

It is another object of the present invention to construct such a belt with improved resistance to rupture in the root area of the belt teeth.

It is still another object of this invention to provide a belt in which the jacket and the rubber tooth structure which it covers, cooperate to provide composite teeth of sufficient resilience to relieve some of the stress in the root area of the belt teeth.

It is a concomitant object of the invention to provide a belt construction which overcomes drawbacks of prior constructions and in which the wear-resistant jacket material cooperates with the elastomeric material of the belt teeth to provide a belt capable of use for relatively high horsepower applications while exhibiting a belt life substantially longer than can be expected with prior belt constructions under similar operating conditions.

SUMMARY OF THE INVENTION

Briefly described, the objects of the invention are met by the provision of an endless positive drive power transmission belt having a layer of wear-resistant fabric positioned substantially along the periphery of the alternating land and teeth portions of the belt, said fabric being substantially non-stretchable in either the longitudinal or the transverse direction thereof, having been treated with a resin which, when it sets, locks the yarns of the fabric to one another and substantially reduces the amount of elastomeric tooth material which can penetrate the interstices between such yarns, whereby the fabric cover even though it is initially much stiffer than "stretchable" fabric, retains a greater degree of flexibility after the belt fabrication than would conventional stretchable fabric whose interstices were substantially filled with elastomeric tooth material (i.e., retains a greater degree of flexibility in combination with the belt tooth which it covers than the combination would exhibit if the interstices of the fabric were substantially filled with elastomer). This, in turn, results in longer belt life, at higher horsepower operating conditions, than possible with current belt constructions.

The positive drive power transmission belt, according to the present invention, has an elastomeric body portion, a tensile band embedded in the body portion, a plurality of teeth of vulcanized elastomeric material integral with the body portion, and each possessing a predetermined spring rate, said teeth being positioned along a peripheral surface of the belt, and a fabric cover formed over the teeth and over the land portions between the teeth, said fabric cover cooperating with said teeth such that the spring rate of each fabric covered tooth is greater than 1.2 times and less than 3 times the spring rate of such tooth alone. Preferably, the spring rate of each fabric covered tooth is greater than 1.4 times and less than 2.8 times the spring rate of the corresponding tooth alone, the fabric is a balanced cloth, and bias-cut, has warp and weft yarns and a heat set thermosetting resin cooperating with said warp and weft yarns for substantially locking them in place so as to dimensionally stabilize said fabric. Preferably, the warp and weft yarns are of non-crimped i.e., non-textured construction, and are preferably nylon. The fabric in the preferred embodiment is sufficiently tightly woven so that it, even prior to the application thereto of said resinous locking means, has a porosity of less than 30 cu ft/min of air flow. Such porosity is reduced even further by treating the fabric with the resin which latter at least partially obstructs the interstices of said fabric, so that the unvulcanized elastomeric belt tooth material, which is preferably neoprene rubber, cannot, during belt manufacture, penetrate substantial portions of the spaces formed at the interstices of the fabric.

Thus, the improved belt according to this invention comprises a jacket made from a fabric in which the warp and weft yarns are non-textured and are woven in such a way as to minimize the size of the interstices found therebetween. Furthermore, the fabric remains substantially unstressed during the belt molding operation. The result is that during the molding operation the elastomeric tooth material does not substantially penetrate the fabric cover. Consequently, the cover has an improved capacity to deflect with the elastomeric tooth material under load because the adhesion of the cover to the tooth material is principally chemical and not mechanical, i.e., without significant penetration of the cover by the elastomeric material. The deformation of this so-called "non-stretch" fabric is further enhanced by bias-cutting of the fabric and arranging it with its warp and weft yarns each at an angle of between 30 and 60 degrees with the longitudinal axis of the belt. The improved fabric cover jacket and the vulcanized elastomeric belt tooth compound together form a composite belt tooth that will deform to the extent that both the rubber tooth and the fabric jacket share substantially in absorbing the driving forces applied to the belt.

We have found that by thus balancing the properties of the fabric and the rubber tooth compound so that the drive load is more evenly distributed between the fabric and the belt tooth the aforesaid problems can be overcome. Thus, in accordance with the present invention is provided a belt in which we believe, although we are not certain, that the rubber tooth transmits at least 30% of the load and the load on the fabric is reduced to 70% or less. Such a more balanced construction has greater resilience and less hysteresis than constructions of the prior art in which either the rubber or the covering jacket bear a disproportionately large portion of the load. Since hysteresis energy is well known to cause heating and deleterious effects in rubber and fabric composites subjected to repeated stresses, the reduction of such hysteresis is extremely beneficial.

According to one method of making the preferred belt herein (1) the fabric material which is used for the jacket is treated with cement and/or resin and is heat-set to stabilize the structure of the fabric, (2) the thus treated, stabilized, fabric is laid into a toothed mold (without stretching) so that its outer surface lies against the mold surface to form the cover at the interior surface of the belt, (3) elastomeric belt tooth material is applied against the inner surface of the fabric filling the mold tooth cavities and forming a pre-form belt component (4) the pre-form is removed and placed on a conventional mold, (5) tensile members are wound around the outside surface of the pre-form, (6) the overcord elastomer is applied around the tensile members for forming the body of the belt and (7) the belt is cured.

BRIEF DESCRIPTION OF THE DRAWINGS

Preferred aspects of this invention will be described with reference to the accompanying drawings, in which like numerals designate like parts in the various figures and wherein:

FIG. 3 is a longitudinal cross-sectional fragmentary view of a pre-formed jacket tooth component of a power transmission belt made according to the invention;

FIG. 4 is a fragmentary, perspective view of the pre-formed component of FIG. 3.

FIG. 5 is a schematic representation of the test apparatus used for measuring the resiliency of the belt teeth according to the invention.

PREFERRED EMBODIMENT OF THE INVENTION

Figure 1:
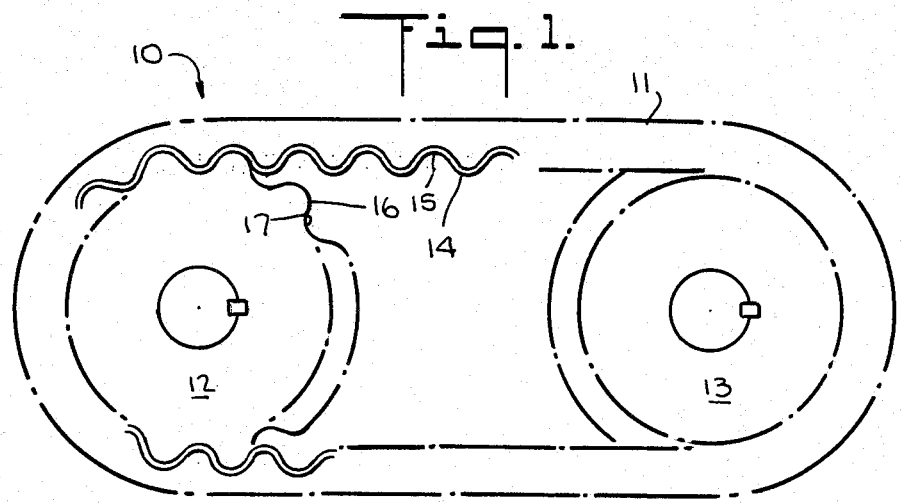
FIG. 1 is a side elevation of a typical power transmission system employing a belt which forms the subject of the present invention.

Referring now to the drawings, in FIG. 1 a belt drive 10 is shown which includes a flexible power transmission belt 11 trained around a pair of gears or pulleys 12 and 13. The belt 11 includes a plurality of alternating teeth 14 and grooves 15 extending generally transversely therof. The pulleys 12 and 13 have a plurality of alternating teeth 16 and grooves 17 extending generally axially thereof which mesh or engage with the belt teeth 14 and grooves 15 during the operation of the drive 10.

Figure 2:
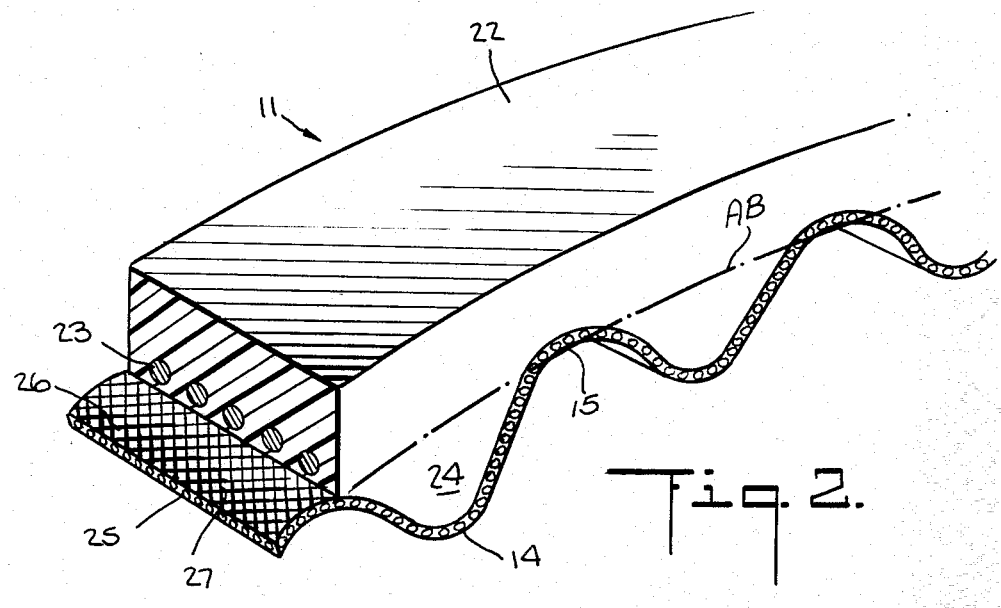
FIG. 2 is a fragmentary, perspective, view of the power transmission belt shown in FIG. 1.

As best shown in FIG. 2 the belt 11 includes a body, or overcord section, 22 of flexible polymeric material. The body 22 of the belt 11 includes a reinforcing tensile layer or plurality of tensile members such as the longitudinally extending and spaced tensile cords 23. These tensile members may consist of essentially inextensible material such as wrapped strands of glass fiber or steel to provide the belt with the necessary longitudinal strength and stability. A plurality of driving teeth 14 of substantially uniform height are integrally formed in at least one surface of the body 22 with the teeth extending transversely of the belt 11.

The tensile cords 23 are disposed substantially on the dedendum line AB of the driving teeth 14 of the belt 11 as is well known practice in regard to synchronous drive belts.

Elastomeric material utilized in the overcord section 22 and in the tooth body 24 are compatible and may be of the same or different type elastomer preferably chloroprene rubber which is curable by vulcanization. The following elastomeric materials may also be utilized: epichlorohydrin, chlorosulphonated polyethylene, chlorinated polyethylene, nitriles, ethylene propylene, ethylene acrylic, fluorocarbon elastomers, urethanes, and the like.

A reinforcing fabric 25 intimately fits along the alternating teeth 14 and alternating land portions 15 of the belt to form a face cover therefor. This fabric is preferably a balanced cloth fabric consisting of non-textured warp and weft yarns preferably bias-cut so that the warp and weft yarns each make an angle of between 30 and 60 degrees with respect to the longitudinal axis of the belt 11. Each yarn is made up of many filaments. In a preferred embodiment of the invention the fabric layer 25 consists of a wear-resistant fabric in which the warp and weft yarns are made of nylon 6,6 filaments and which is a "non-stretch" fabric as will be described in more detail below.

According to one aspect of the invention, the wear-resistant fabric layer 25 is one which, prior to being formed into a component portion of the belt, is treated with a thermosetting resin which is thereafter heat-set to stabilize the structure of the fabric (i.e. to interlock the warp threads 26 and the weft threads 27 so as to form a non-stretch fabric).

The fabric 25, after being heat-set as described above and thus stabilized with respect to stretchability, is, in non-stressed, relaxed condition, laid into and made to conform to the shape of the toothed surface of a toothed mold. Thereafter a chloroprene rubber elastomer, or the like, is pressed against the free surface of the fabric in the mold and the toothed portion of the belt is pre-formed. The pre-formed unvulcanized component 29 consisting of the tooth shaped rubber 24 and the fabric layer 25 is then wrapped around and in conventional manner positioned on a standard mold for making toothed belts as for example in Skura U.S. Pat. No. 3,078,206. Tensile cords 23 are then tightly wrapped around the pre-form in conventional manner and rubber for forming the outer elastomeric body portion 22 of the belt is then conventionally applied around the tensile members 23. Then the entire belt 11 is vulcanized in conventional manner.

With conventional tooth shapes the stress is concentrated in a relatively small volume in the region of the roots of the belt teeth. This becomes a problem particularly for belts operated for extended periods of time at high horse-power loading. It was believed, as may be seen from U.S. Pat. No. 3,937,094, assigned to Pirelli, that for high torque application the jacket i.e. cover, material should be very stiff and scarcely deformable in comparison with the elastomeric material forming the teeth of the belt. As a result, in such prior art belt constructions intended for high torque, substantially the entire load on the teeth is carried by the stiff jacket material and hardly any of the load is carried by the rubber material of the teeth themselves. This, however, results in reduced belt life since the fabric cover soon ruptures in the region of the root of the teeth.

Other belt constructions in the prior art were intended to get around this problem by making the jacket material stretchable and thus relatively flexible with the intention that the resulting composite jacketed rubber tooth would also exhibit a high degree of flexibility. Some sort of jacket of course was necessary since the rubber tooth by itself (which of course would be the most flexible) needed protection against wear, abrasion, and shear. It was discovered, however, that the use of stretchable fabrics did not result in the jacketed tooth being sufficiently flexible to overcome the problems of shortened belt life resulting from rupture of the fabric material in the tooth root region. Actually, we found that the prior art stretchable fabrics, while more resilient per se than the nonstretch fabric of the instant invention, resulted in a more rigid tooth surface region than expected and since the composite fabric covered tooth is what is subjected to stress and not just the fabric alone or the rubber tooth alone, the use of such stretchable fabrics of the prior art resulted in a belt having an unsatisfactorily short belt life.

We now believe, though we are not certain, that the reason that use of the conventional stretch fabric results in a more rigid jacketed tooth, is, that the uncured tooth rubber fills substantial portions of the spaces comprising the interstices of the stretchable fabric. Since, during manufacture of the belt by conventional methods, e.g., the method taught in Skura, U.S. Pat. No. 3,078,206, the tooth rubber is forced against the fabric and forces the latter toward and into conformance with the toothed mold surface, it stretches the fabric and can then more readily penetrate the then enlarged interstices thereof. Vulcanization locks the then stretched fabric in place and appears to rigidify it further, due to the quantity of vulcanized rubber which fills substantial portions of the interstices. The resulting composite tooth assembly is substantially more rigid than the same tooth assembled with a jacket fabric in accordance with the present invention. According to the present invention there is provided an abrasion and rupture resistant fabric jacket cooperating with the teeth of a power transmission belt such as to allow such jacketed teeth to be sufficiently resilient so that the underlying rubber tooth material will carry a more substantial portion of the load than previously was the case. In conventional belt constructions, as the jacket was made stiffer, the underlying tooth material carried too small a proportion of the load and too much of the load was carried by the stiffened jacket, resulting in early rupture.

For a 14 mm belt according to our inventin, the preferred fabric is a balanced cloth, bias-cut fabric having warp and weft yarns of nylon 6,6. The fabric is tightly woven so as to have about 35 warp yarns per inch and about 35 weft yarns per inch. The denier of each of the yarns is about 1260 resulting in a fabric which has a porosity of less than 30 cu ft/min of air flow. In keeping with the foregoing, the preferred fabric for an 8 mm belt is a balanced cloth having warp and weft yarns of nylon 6,6, yarn. Said fabric having a thickness of approximately 0.018 inch, and having about 33 warp and about 33 weft yarn per inch. While for a 5 mm belt there are about 32 warp and 32 weft yarns per inch with the fabric thickness being about 0.011 inch. The fabric comprises a locking means, namely a resin such as, for example, resorcinol formaldehyde ("RFL") or similar material having adhesive properties so as to lock together the warp and weft yarns of the fabric at the intersections thereof as well as the individual filaments within the warp and weft yarns. The tightly woven fabric is treated with RFL or similar adhesive material which is then heat-set. After heat setting, the treated fabric is substantially impervious to the flow-through of unvulcanized elastomeric tooth material so that the elastomeric tooth material, when pressed against the surface of the fabric layer at the time the teeth are molded, does not flow through the interstices of the fabric. The fabric, treated in the manner described above, is nevertheless capable of being intimately adhered by chemical rather than mechanical bonding, to the outer surface of the tooth rubber.

We believe that the resiliency of the composite tooth according to our invention results at least in part from the interstices of the fabric being substantially free of tooth rubber and that the stiffer composite structure of the prior belts described above results from the substantial filling of the interstices of the fabric with tooth rubber during manufacture of those belts due, at least in part, to the use of stretchable fabric which permits the interstices to expand as rubber is forced into them.

The present invention has achieved the surprising result that by the use of fabric which in its bare and untreated condition is more rigid than conventional "stretchable" jacket fabric and which is made even more rigid by treatment with a resin such as RFL which is then heat-set, the finished belt teeth exhibit, in jacketed condition, a greater resiliency i.e. lower tooth Spring Rate (K), than is exhibited by the jacketed teeth of a conventional belt. Yet, the fabric of the belt in accordance with the present invention is generally heavier and more abrasion resistant than the jacket fabric of such conventional belt made for example with the Skura process. Furthermore, the belt according to the present invention has a higher tooth load capacity i.e. a greater resistance to shear than the conventional belt. As may be seen from the test results below, we are able to achieve belts having a longer belt life than was previously achievable with conventional belts due to our increased tooth flexibility. Thus, despite the fact that one would expect a more rigid tooth structure to result from the use of stiffer, so-called non-stretch fabric, such as used in accordance with the present invention, we are surprisingly able to achieve a more flexible tooth structure with the use of such fabric.

As used herein, tooth Spring Rate (K) is defined as the load (F) applied to the tooth per inch of the belt width divided by the corresponding belt tooth deformation in inches. The belt tooth deformation is a measure of the deformation of a tooth under a given load. The manner of measuring tooth deformation and determining the Spring Rate (K) for a given belt will be described hereinbelow.

As will be seen from FIG. 5 of the drawings, the test stand for measuring the values required to calculate the Spring Rate (K) consists of a two shaft fixture with one fixed shaft 30 and one rotatable shaft 31. The rotatable shaft in turn is connected through a gear reducer 32 to an electric motor 33. A torque transducer 34 is attached to the shaft 31 in such a way that the torque being transmitted through the shaft can be measured. Pulleys 35a 35b are mounted on shafts 30 and 31 and a belt 11 placed on the pulleys and pre-tensioned with a lead-screw 37, and crank device 38 well known in the art. The lead screw 37 is capable of moving the shaft 30 with respect to the shaft 31 in a direction to tension the belt 11. A needle tipped strain gauge 36 is anchored to the rotatable pulley and the needle 36a inserted into a selected point on the belt tooth in such a manner that the deformation of the belt tooth in the direction parallel to the tensile members 23 of belt 11, but at a given distance below the belt land line AB can be measured as torque is applied to the pulley 35b by the motor and the belt tooth is loaded.

The test procedure and the results of such tests as well as the procedure for determining the Spring Rate (K) is set forth in more detail below.

EXAMPLE

In order to compare the performance of belts having conventional construction, herein referred to as "A Belts", with those having the novel construction of this invention, herein referred to as "B Belts", the following procedure was followed:

"A Belts":

Several positive or synchronous drive belt samples were manufactured by conventional methods using conventional materials well known in the art. All the "A Belts" were formed of a chloroprene rubber composition having a nylon fabric cover on the belt teeth and including a tensile member of fiberglass cords disposed substantially on the dedendum line of the belt teeth. The nylon fabric was of the "stretch-type" and the belts were manufactured by use of the conventional Hi-last method as taught by Skura U.S. Pat. No. 3,078,206. The "A Belts", after manufacture, were statically and dynamically tested on toothed pulleys of appropriate dimension and configuration as will be hereinafter described.

"B Belts":

Several positive or synchronous drive belt samples were manufactured in accordance with the present invention. All the "B Belts" were formed of a chloroprene rubber composition having a nylon fabric cover on the belt teeth and including a tensile member of fiberglass cords disposed substantially on the dedendum line of the belt teeth. The nylon fabric was of the "nonstretch-type" and the belts were manufactured in accordance with the present invention. The "B Belts", after manufacture, were statically and dynamically tested using the same test procedure and apparatus as used for testing the "A Belts".

I. Static Test Procedure used for "A Belts" and for "B Belts".

The test stand described above and in FIG. 5 is used to measure tooth deformation and tooth load as follows: A 28 groove 14 mm pitch HTD pulley as described in Miller, U.S. Pat. No. 3,756,091 is mounted on each shaft and a 1400 mm long, 14 mm pitch, 20 mm wide belt placed on the pulleys and pretensioned to 100 lbs. The needle tipped strain gauge is anchored to the rotatable pulley and the needle inserted along the center line of the selected belt tooth at a distance equal to 24% of the tooth depth below the belt land line. This arrangement allows the measurement of the belt tooth deformation in the direction parallel to the tension member when a torque is applied to the rotatable pulley.

A preload torque of 30 ft.-lbs. is applied to insure that the belt teeth are in full contact with the mating pulley groove flanks. The torque is then increased to 50 ft-lbs and the corresponding tooth deformation recorded. This procedure is followed for each of the first 8 belt teeth in mesh. The tooth load on the highest loaded tooth is then calculated for the 30 ft.-lbs. and 50 ft.-lbs applied torques and the corresponding deformations noted. The tooth Spring Rate (K) is then calculated by using the following equation.

$$K = \frac{F50 - F30}{D50 - D30}$$

Where
K = Tooth Spring Rate
F50 = Tooth load in pounds at 50 ft.-lbs applied torque
F30 = Tooth load in pounds at 30 ft.-lbs applied torque
D50 = Tooth deformation in inches at 50 ft.-lbs applied torque
D30 = Tooth deformation in inches at 30 ft.-lbs applied torque The following table, Table I, represents typical results using the aforesaid test apparatus and procedure for "A Belts" and for "B Belts", in each of the (i) (ii) and (iii) constructions listed.

TABLE I

Summary of Tooth Spring Rates Converted to 1" Belt Width

| | | |
|---|---|---|
| "A Belts": | | K = 15,028 lb/in/in-width |
| "B Belts": | | |
| (i) | covered with no stretch - non biased-fabric | K = 12,395 lb/in/in-width |
| (ii) | covered with non stretch - biased-fabric | K = 10,705 lb/in/in-width |
| (iii) | fabric cover removed so as to expose bare rubber tooth | K = 4477 lb/in/in-width |

II. Dynamic Test Procedure:

EXAMPLE I

Six "A Belts" and three "B Belts" of 14 mm pitch 1400 mm long and 40 mm wide were life tested under the following dynamic test conditions:

| RPM | 2400 | Torque 158.5 Ft-lbs | |
|---|---|---|---|
| HP | 72.4 | Sprockets | 36 Grooves - Driver |
| Tension | 195 lbs | | 36 Grooves - Driven | with the following results:

| | |
|---|---|
| Average life of "A Belts" tested | 383 hours |
| Average life of "B Belts" tested | 1702 hours |

EXAMPLE II

Three "A Belts" and three "B Belts" of 14 mm pitch 1400 mm long and 40 mm wide were life tested under the following dynamic test conditions:

| RPM | 1750 | Torque 90 Ft-lbs | |
|---|---|---|---|
| HP | 30 | Sprockets | 28 Grooves - Driver |
| Tension | 312 lbs | | 28 Grooves - Driven | with the following results:

| Average life of "A Belts" tested | 132 hours |
|---|---|
| Average life of "B Belts" tested | 1754 hours |

III. In constructing belts in accordance with the present invention the following materials are preferred:

(1) Fabric:

(a) Fabric material:

The warp yarn and the weft or filling yarn for the fabric are preferably each 1260/1 nylon yarn, each having a 2.9 TPI "Z" twist and the tensile strength of the fabric in the warp direction is approximately 1200 pounds per inch of fabric width and the tensile strength of the fabric in the fill direction is approximately 1,050 pounds per inch of fabric width.

(b) Fabric construction:

The weave of the fabric is such that it is a balanced cloth and the warp and weft or filling yarns have approximately 35 ends per inch and 35 picks per inch respectively. The thickness of the fabric is approximately 0.029 inches. The weight of the fabric is approximately 13.5 ounces per square yard and the porosity measured in cubic feet per minute, using ASTM test method D 737-75, is less than 30 cubic feet per minute of air flow.

(c) Air permeability:

Test results comparing fabrics used in making "A Belts" and fabrics used in making "B Belts", using ASTM method D 735-75, were as follows:

| Air Permeability Test Results | |
|---|---|
| Raw Stretch Fabric | 52.5 cubic ft/min. |
| Treated (but not heat-set) Stretch Fabric ("A Belts") | 39.2 cubic ft/min. |
| Raw Non-stretch Fabric | 7.12 cubic ft/min. |
| Treated and heat-set Non-Stretch Fabric ("B Belts") | 2.68 cubic ft/min. |

(2) Resin:

Resorcinol formaldehyde latex ("RFL") adhesives have been used in the past for treatment of various fabrics to improve adhesion between rubber and tire cord made from synthetic fibers. In addition to improved fabric to elastomer adhesion we have found that RFL coated fabric, provided that it is heat-set, exhibits good cohesion not only of the yarns to one another but also of the filaments within the yarns of the fabric by keeping the filaments aligned and working together. Application of the resin to the fabric is conveniently carried out by running the fabric through a bath of the resin and squeezing out the excess liquid. The preferred RFL dip formulation is the following:

| Preferred RFL Dip Formulation | |
|---|---|
| | Parts by weight |
| Part I | |
| Water | 141.0 |
| NaOH (50%) | 1.3 |
| NH$_4$OH (28%) | 1.7 |
| Penacolite R-2170 (75%) | 22.0 |
| + Part II | |
| Vinylpyridine Latex (41%) | 244.0 |
| HAF Black (25%) | 60.3 |
| + Part III | |
| Formaldehyde (37%) | 11.0 |
| Total | 481.3 |

Solids pickup on treated fabric ranges from 8% to 11% by weight. Preferred curing temperature 425° F. to 475° F. for 60 to 120 seconds.

(3) Tooth Rubber and Belt body i.e. overcord, rubber:

The tooth and overcord rubber may be of the same or of different hardness and is preferably a neoprene blend rubber as for example the rubber blend disclosed in Skura, Pat. No. 3,078,206.

(4) Tension member:

Fibers of polyester, nylon, carbon, boron, aramid, glass, or strands of wire (or blends thereof).

While certain representative embodiments and details have been shown for the purpose of illustrating the invention, it will be apparent to those skilled in the art that various changes and modifications may be made therein without departing from the spirit or scope of the invention.

What is claimed is:

1. A positive drive power transmission belt having an elastomeric body portion, a tensile band embedded in the body portion, a plurality of teeth of elastomeric material integral with the body portion and each possessing a predetermined spring rate, said teeth being positioned along a peripheral surface of the belt, and a fabric cover formed over the teeth and over the land portions between the teeth, said fabric comprising warp and weft yarns and locking means cooperating with said warp and weft yarns for substantially locking them with respect to each other at the intersections thereof for dimensionally substantially stabilizing said fabric, said locking means at least partially obstructing the interstices of said fabric whereby said interstices are substantially free of said elastomeric material, said fabric cover cooperating with said teeth such that the spring rate of each fabric covered tooth is greater than 1.2 times and less than 3 times the spring rate of such tooth alone.

2. The positive drive power transmission belt of claim 1, wherein the spring rate of each fabric covered tooth is greater than 1.4 times and less than 2.8 times the spring rate of the corresponding tooth alone.

3. The positive drive power transmission belt of claim 1, wherein said fabric is a balanced cloth.

4. The positive drive power transmission belt of claim 1 wherein said fabric is bias-cut.

5. The positive drive power transmission belt of claim 1 wherein said locking means is a heat set thermosetting resin cooperating with said warp and weft yarns for substantially locking them with respect to each other.

6. The positive drive power transmission belt of claim 1 wherein said warp and weft yarns are of non-textured construction.

7. The positive drive power transmission belt of claim 1 wherein said fabric comprises nylon yarn.

8. The positive drive power transmission belt of claim 1 wherein said warp and weft yarns are woven together such that the woven material, prior to the application thereto of said locking means exhibits a porosity of less than 30 cu. ft./min. of air flow.

9. The positive drive power transmission belt of claim 1 wherein said elastomeric material is vulcanized chloroprene rubber.

10. The positive drive power transmission belt of claim 1, wherein said fabric is balanced cloth bias-cut fabric and comprises warp and weft yarn of nylon 6,6, said fabric having a thickness of approximately 0.029 inch and said fabric having approximately 35 warp ends per inch and approximately 35 weft ends per inch and said locking means is a heat set thermosetting resin comprising RFL.

11. The positive drive power transmission belt of claim 1, wherein said fabric is a balanced cloth bias cut and comprises warp and weft yarn of nylon 6,6, said fabric having a thickness of approximately 0.018 inch and said fabric having approximately 33 warp ends per inch and approximately 33 weft ends per inch, and said locking means is a heat set thermosetting resin comprising RFL.

12. The positive drive power transmission belt of claim 1, wherein said fabric is a balanced cloth bias cut and comprises warp and weft yarn of nylon 6,6, said fabric having a thickness of approximately 0.011 inch and said fabric having approximately 32 warp ends per inch and approximately 32 weft ends per inch, and said locking means is a heat set thermosetting resin comprising RFL.

* * * * *